(12) United States Patent
Agapiou et al.

(10) Patent No.: US 10,630,151 B2
(45) Date of Patent: Apr. 21, 2020

(54) ROTOR FOR AN INDUCTION MOTOR

(71) Applicant: GM Global Technology Operations LLC, Detroit, MI (US)

(72) Inventors: John S. Agapiou, Rochester Hills, MI (US); Thomas A. Perry, Bruce Township, MI (US); James G. Schroth, Troy, MI (US); Hongliang Wang, Sterling Heights, MI (US); Michael P. Balogh, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 346 days.

(21) Appl. No.: 15/636,745

(22) Filed: Jun. 29, 2017

(65) Prior Publication Data

US 2019/0006920 A1    Jan. 3, 2019

(51) Int. Cl.
  *H02K 15/00*    (2006.01)
  *B22D 19/00*    (2006.01)
  *H02K 17/16*    (2006.01)

(52) U.S. Cl.
  CPC ..... *H02K 15/0012* (2013.01); *B22D 19/0054* (2013.01); *H02K 17/165* (2013.01)

(58) Field of Classification Search
  CPC ............. H02K 15/0012; H02K 17/165; B22D 19/0054
  USPC ................................................ 310/211, 210
  See application file for complete search history.

(56) References Cited

U.S. PATENT DOCUMENTS

| | | | |
|---|---|---|---|
| 8,312,914 B2 | 11/2012 | Walker et al. | |
| 8,347,485 B2 | 1/2013 | Biederman et al. | |
| 8,643,241 B2* | 2/2014 | Kleber | H02K 17/165 310/211 |
| 8,910,371 B2 | 12/2014 | Kleber et al. | |
| 9,082,331 B2 | 7/2015 | Wang | |
| 9,219,399 B2* | 12/2015 | Kleber | H02K 15/0012 |
| 9,397,539 B2 | 7/2016 | Kleber et al. | |
| 9,621,012 B2* | 4/2017 | Agapiou | H02K 17/165 |
| 2011/0291516 A1* | 12/2011 | Alexander | B22D 19/0054 310/211 |
| 2012/0217838 A1 | 8/2012 | Keber et al. | |
| 2013/0020899 A1* | 1/2013 | Kleber | H02K 15/0012 310/211 |

(Continued)

FOREIGN PATENT DOCUMENTS

| | | |
|---|---|---|
| CN | 102136783 A | 7/2011 |
| CN | 103795195 A | 5/2014 |

OTHER PUBLICATIONS

U.S. Appl. No. 15/254,834, filed Sep. 1, 2016 by Agapiou et al. All Pages.

(Continued)

*Primary Examiner* — Forrest M Phillips

(57) ABSTRACT

A rotor for an induction motor includes a first shorting end ring, a second shorting end ring, and a plurality of conductor bars. Each conductor bar has a first end and a second end and is coated with an electrically conductive material. The first end of each conductor bar is in electrical and mechanical contact with the first shorting end ring, and the second end of each conductor bar is in electrical and mechanical contact with the second shorting end ring. The conductive material is disposed between each conductor bar and the respective shorting end rings.

20 Claims, 3 Drawing Sheets

(56) References Cited

U.S. PATENT DOCUMENTS

2014/0319956 A1\* 10/2014 Wang ................ B22D 19/0054
 310/211
2015/0288265 A1 10/2015 Hanna et al.
2015/0333606 A1\* 11/2015 Hanna ................ H02K 15/0012
 310/211

OTHER PUBLICATIONS

Pending U.S. Appl. No. 15/439,009, filed Feb. 22, 2017 by Agapiou et al. All Pages.

\* cited by examiner

ROTOR FOR AN INDUCTION MOTOR

INTRODUCTION

The present disclosure relates to electrically powered motors.

Some electric motors convert electrical energy to mechanical energy and convert mechanical energy to electrical energy. Electric motors may be connected to an energy storage device to enable the transfer of energy therebetween. AC induction motors are a particular type of electric motor that induces current flow to cause portions of the motors rotor to become magnetized during the operation of the motor. AC induction motors utilize single-phase or multi-phase power to produce a rotating magnetic field through a series of stators to turn a rotor. The rotating magnetic field induces electrical current through a plurality of conductor bars in the rotor. The electrical current in the conductor bars reacts with the magnetic field produced by the stators to create torque at the rotor for performing work.

Power density output from an electric induction motor correlates to the quality of the conductor bars. It is known that cracks and voids formed between the conductor bars and the shorting end rings during fabrication reduce power density output of the electric induction motor.

Thus, while current rotors and their fabrication achieve their intended purpose, there is a need for a new and improved system and method for fabricating rotors for induction motors.

SUMMARY

According to several aspects, a rotor for an induction motor includes a first shorting end ring, a second shorting end ring, and a plurality of conductor bars. Each conductor bar has a first end and a second end and is coated with an electrically conductive material. The first end of each conductor bar is in electrical and mechanical contact with the first shorting end ring, and the second end of each conductor bar is in electrical and mechanical contact with the second shorting end ring.

In an additional aspect of the present disclosure, a small amount of residual flux material may be disposed between the conductive material and the respective first and second shorting end rings.

In another aspect of the present disclosure, each conductor bar is coated with the electrically conductive layer along the entire length of the conductor bar or just at the ends of the conductor bar that contact the first and the second shorting end rings.

In another aspect of the present disclosure, the first and second shorting end rings are made of cast aluminum.

In another aspect of the present disclosure, the conductor bars are made of wrought copper.

In another aspect of the present disclosure, the conductive layer is made of nickel.

In another aspect of the present disclosure, the conductive layer is made of cobalt, iron, manganese, chromium, vanadium or titanium.

In another aspect of the present disclosure, the conductive layer is applied to the conductor bar by physical vapor deposition, chemical vapor deposition or plating.

In another aspect of the present disclosure, the conductive layer is applied by electrolytically plating.

In another aspect of the present disclosure, the conductive layer is applied by electrolessly plating.

In another aspect of the present disclosure, the conductive layer has a thickness of about 5 micrometers to about 15 micrometers.

In another aspect of the present disclosure, the conductive layer has a thickness of about 10 micrometers.

According to several aspects, a rotor for an induction motor includes a first shorting end ring made of cast aluminum, a second shorting end ring made of cast aluminum, and a plurality of conductor bars. Each conductor bar is made of wrought copper, has a first end and a second end, and is coated with an electrically conductive layer. The first end of each conductor bar is in electrical and mechanical contact with the first shorting end ring, and the second end of each conductor bar is in electrical and mechanical contact with the second shorting end ring. The conductive layer is disposed between each conductor bar and the respective shorting end rings.

In an additional aspect of the present disclosure, a small amount of flux material may be disposed between the conductive layer and the respective first and second shorting end rings.

In another aspect of the present disclosure, each conductor bar is coated with the electrically conductive layer along the entire length of the conductor bar or just at the ends of the conductor bar that contact the first and the second shorting end rings.

In another aspect of the present disclosure, the conductive layer is made of nickel.

In another aspect of the present disclosure, the conductive layer is made of cobalt, iron, manganese, chromium, vanadium or titanium.

In another aspect of the present disclosure, the conductive layer is applied to the conductor bar by physical vapor deposition, chemical vapor deposition or plating.

According to several aspects, a method of fabricating a rotor for an induction motor includes coating a plurality of conductor bars with an electrically conductive layer, each conductor bar being made of wrought copper and having a first end and a second end; electrically connecting the first ends of the plurality of conductor bars to a first shorting end ring made of cast aluminum, the conductive layer being disposed between each conductor bar and the first shorting end ring; and electrically connecting the second ends of the plurality of conductor bars to a second shorting end made of cast aluminum, the conductive layer being disposed between each conductor bar and the second shorting end ring.

In additional aspect of the present disclosure, the conductive layer is made of nickel, cobalt, iron, manganese, chromium, vanadium or titanium.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The stators of an AC induction motor may include a plurality of paired poles that are created from a series of windings. The stators may be distributed around a rotor. Examples of the rotor may include a laminated structure with conductor bars connected through shorting end rings. A squirrel-cage rotor has a generally cylindrical shape that includes a plurality of conductor bars along a length of a laminated stack at an outer perimeter. In some induction motors, the plurality of conductor bars may be made of copper due to the thermal and conductive properties of copper. Other materials, such as aluminum, may be used for the conductor bars. The conductor bars in the squirrel-cage rotor are connected at their ends by two shorting end rings.

Power density output from an electric induction motor correlates to quality of the conductor bars and mass bulk density of the individual conductor bars. In some conductor bars and shorting end rings that are cast-in-place, voids and cracks may form between the conductor bars and the shorting end rings during fabrication, which may reduce power density output of some electric induction motors.

A bonding agent may be applied as a surface treatment to the each of the conductor bars for creating a more robust metallurgical bond between the conductor bars and shorting end rings. In various configurations described herein, the bonding agent may be a flux material applied to the conductor bars. Without being bound to any theory, it is believed that the flux material removes oxides that can form on the conductor bars and during the rapid cooling of the molten material thereby creating a better metallurgical bond between the conductor bars and the shorting end rings. Additionally, the bonding agent may be an intermediate element, for example, nickel, applied to conductor bars. Examples of intermediate elements may have high melting points and chemical compatibility with the materials of the conductor bars and the shorting end rings. The bonding agent may be applied to the entire conductor bar or only the first and second exposed ends. By applying a bonding agent to the conductor bars prior to casting the shorting end rings, the power density output of the induction motor may be maintained or improved.

Figure 1:
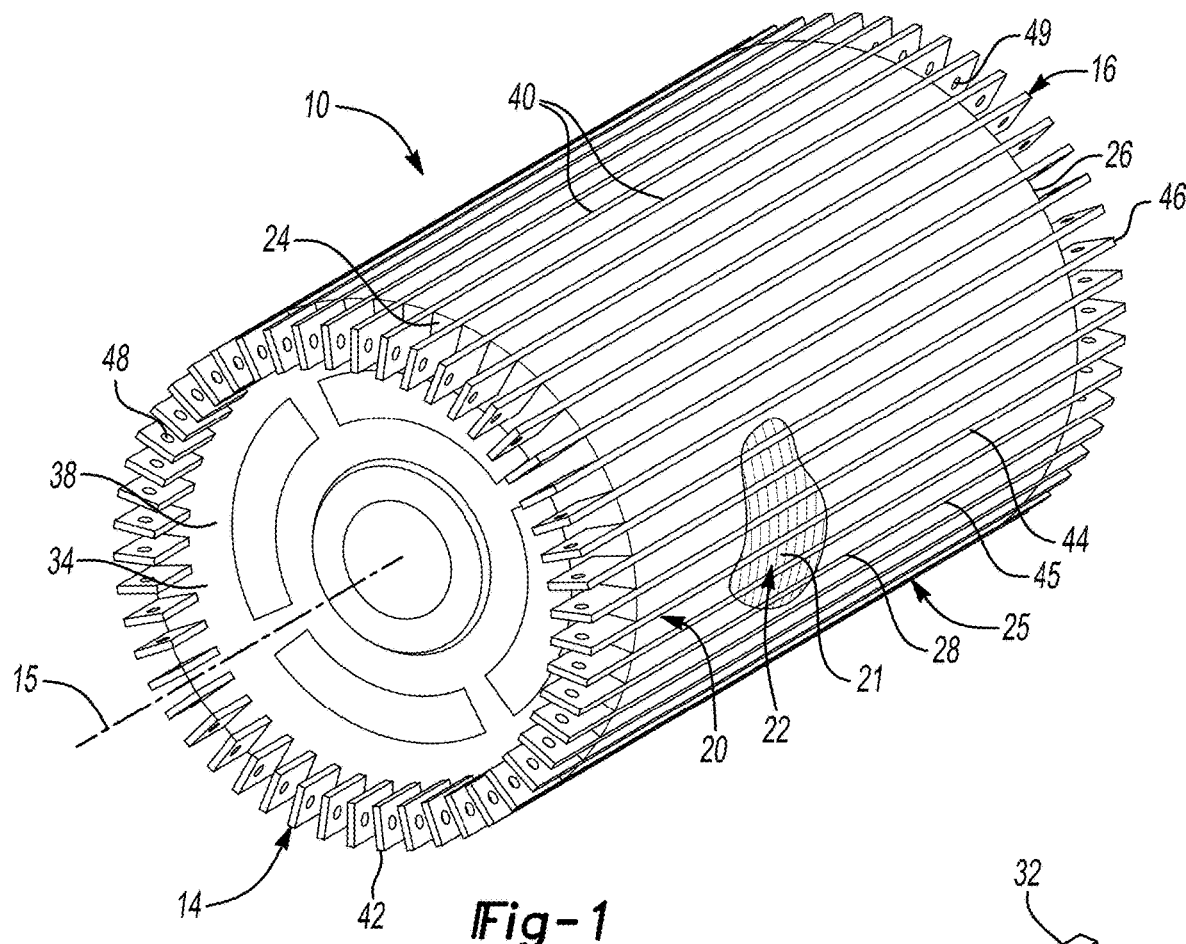
FIG. 1 illustrates an isometric view of a partially assembled rotor assembly for an induction motor in accordance with the principles of the present disclosure.

Referring now to FIG. 1, an isometric view of an induction rotor assembly 10 for an induction motor is illustrated. The induction motor may be any induction motor, including an induction motor for use in a powertrain system for a motor vehicle. The rotor assembly 10 is fixedly attached to a rotor shaft centered upon an axis of rotation 15 using any suitable means, for example, shrink fit and lock-and-key torque fitting. The rotor assembly 10 may be assembled onto the rotor shaft subsequent to assembly of the rotor. The rotor assembly 10 and the rotor shaft share the same axis of rotation 15.

The rotor assembly 10 includes a first end 14 and a second end 16. The rotor assembly 10 is to be assembled into and rotate within a stator of an induction motor.

Examples of the rotor assembly 10 disclosed herein include a rotor core 20. An assembled cylindrically-shaped steel laminate stack 21 may be included in the rotor core 20. Further, the rotor core 20 may include a plurality of longitudinally-oriented conductor bars 40. The rotor core 20 includes first and second end faces 24, 26, and the conductor bars 40 are peripherally disposed through the rotor core 20 with first and second exposed ends 42, 46 extending beyond the respective first and second end faces 24, 26 of the rotor core 20. The first end face 24 of the rotor core 20 corresponds to the first end 14 of the rotor assembly 10, and the second end face 26 of the rotor core 20 corresponds to the second end 16 of the rotor assembly 10.

The rotor core 20 may be fabricated from a plurality of thin laminate sheets 21 formed from ferrous material. In an example, a thickness of the laminated sheets 21 may range from about 0.25 mm (millimeter) (0.010 inch) to about 0.51 mm (0.020 inch). In an example, the laminate sheets 21 are about 0.33 mm (0.013 inch) thick. It is to be understood that the thickness is measured parallel to the axis of rotation 15. The laminate sheets 21 may be stamped using a fine blanking process and may be electrically insulated to minimize eddy currents. Each laminate sheet 21 is a flat annular-shaped device and includes a plurality of radially-oriented slots formed near an outer periphery thereof. When the laminate sheets 21 are assembled into the rotor core 20, the radially-oriented slots are aligned to form grooves 28 that may be longitudinally-oriented parallel with the axis of rotation 15 of the rotor core 20 and are at an outer periphery 25 of the rotor core 20. Alternatively, the grooves 28 may include an acute angle in relation to the axis of rotation 15. The grooves 28 and the conductor bars 40 therein will be discussed as longitudinally-oriented; however, this orientation is understood to include either an alignment that is parallel to the axis of rotation 15 or an acute angle from parallel with respect to the axis of rotation 15.

The grooves 28 may have any suitable cross-sectional shape. In an example of the present disclosure, the grooves 28 have a substantially rectangular-shaped cross-section. The longitudinally-oriented grooves 28 are substantially periodically spaced around the periphery 25, i.e., evenly or varying the spacing in an uneven manner. Conductor bars 40 are each carried within one of the grooves 28. The laminate sheets 22 may be assembled onto the axis of rotation 15 in a laminated fashion using any suitable fabricating method.

The conductor bars 40 may be fabricated from copper-based materials, such as wrought copper, and inserted into each of the grooves 28 by any suitable process, including, for example, insertion of a solid bar or molding. Alternatively, the conductor bars 40 may be fabricated from aluminum-based or similar electrically conductive materials. Examples of the conductor bars 40 disclosed herein include features at each of a first exposed end 42 and second exposed end 46 of the conductor bars 40. It will be appreciated that the conductor bars 40 may include the features described on the first exposed end 42 only, with different features according to another method utilized at the second exposed end 46. Each conductor bar 40 includes the first exposed end 42, a central portion 44, and the second exposed end 46, and each has a peripheral edge 45. The first exposed end 42 projects beyond the first end face 24 of the rotor core 20 and may include a first aperture 48 defined in the first exposed end 42. The second exposed end 46 projects beyond the second end face 26 of the rotor core 20 and may include a second aperture 50 defined in the second exposed end 46. Each of the apertures 48, 50 may be a circular shaped opening in various configurations, although other shapes, for example, rectangular or star pattern, may be utilized. The central portion 44 is to be secured within the grooves 28 formed in the rotor core 20. The peripheral edge 45 of each conductor bar 40 projects through the grooves 28 on the periphery 25 along the central portion 44, and further projects along the first and second exposed ends 42 and 46. The conductor bars 40 may have a parallel relation with the axis of rotation of the rotor shaft or may form an acute angle with the axis of rotation 15 of the rotor shaft.

Figure 2:
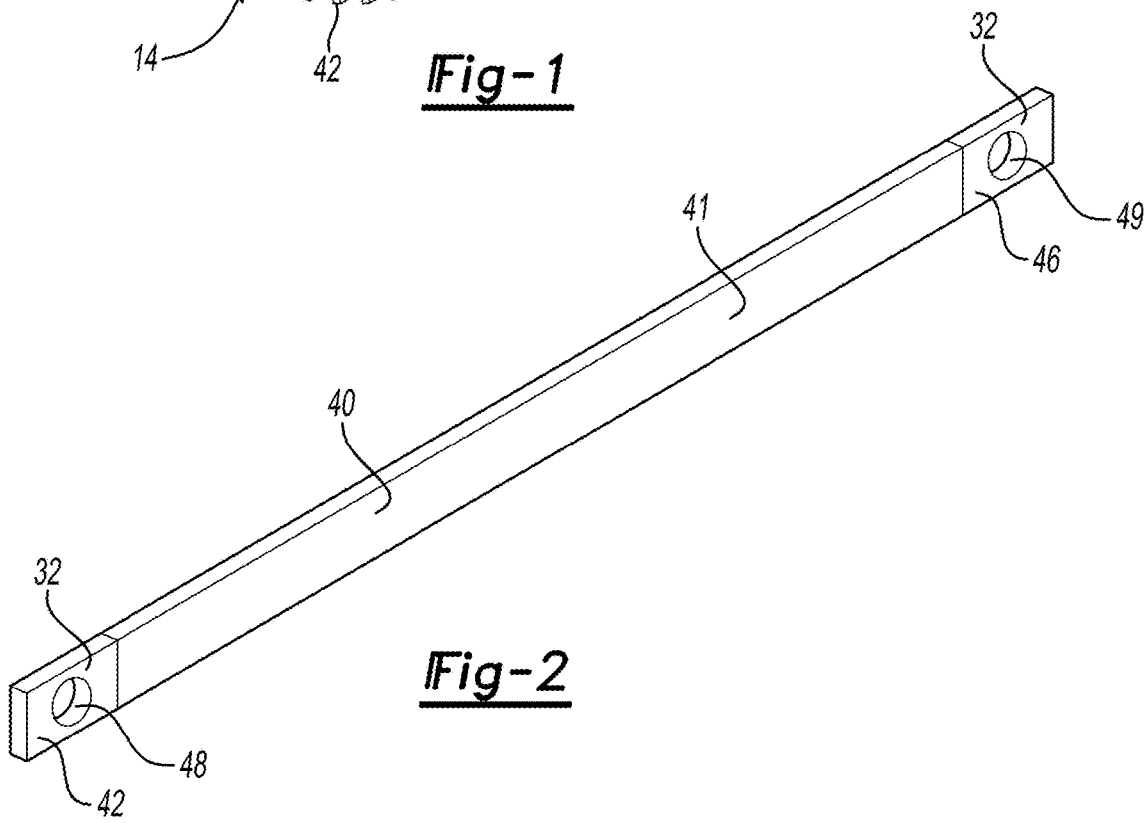
FIG. 2 illustrates an isometric view of a conductor bar in accordance with the principles of the present disclosure.

FIG. 2 depicts a singular conductor bar 40. The conductor bar 40 is coated with a conductive layer 41 described in detail below. The conductive layer 41 can be applied along the entire length of the conductor bar 40 or just at the first and second exposed ends 42 and 46. The first exposed end 42 of the conductor bar 40 is depicted having an optionally coating of a flux material 32 over the conductive layer 41 to a coated length slightly greater than a length of the first exposed end 42 of the conductor bar 40 after the conductor bar is inserted into the rotor 20. The second exposed end 46 of the conductor bar 40 is similarly coated over the conductive layer 41 with the flux material 32. When utilized, the flux material 32 is applied to each conductor bar 40 after insertion into a corresponding groove 28 in the laminate stack 22 (FIG. 1). The sub-assembly of the conductor bars 40 and laminate stack 22 may be flux coated by dipping the sub-assembly into a reservoir of the flux material 32 in a liquid or charged powder form, or by subjecting the sub-assembly to a spray or other surface deposition application.

Figure 3:
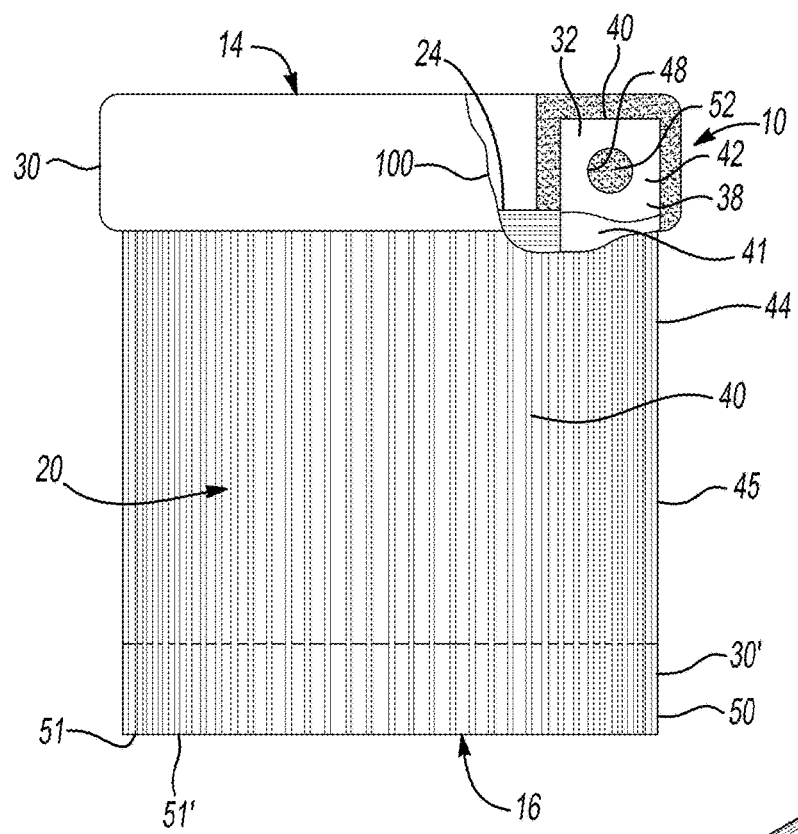
FIG. 3 illustrates a rotor assembly for an induction motor and a partial section view of a shorting end ring in accordance with the principles of the present disclosure.

FIG. 3 illustrates a partially cut away side view of a rotor assembly 10 for an induction motor with a rough casting and partial section view of shorting end ring 30 on the first end 14 and a finished machined casting of shorting end ring 30' on the second end 16. Each of the annular-shaped shorting end rings 30, 30' may be cast in place from aluminum-based materials. Alternatively, the shorting end rings 30, 30' may be cast from copper-based or other electrically conductive materials. Each shorting end ring 30, 30' is cast in place at an end of the laminate stack 22 by inserting the sub-assembly of the conductor bars 40 and laminate stack 22 into a die or mold and introducing a portion of molten material to the first and second ends 14, 16 through any casting process. Both the first and second ends 14, 16 may undergo the same type of overcasting process. It is to be understood that the process discussed herein in terms of the first end 14 may be applied to the second end 16.

In a particular configuration, a first portion of the conductive material, which may be in a molten state when introduced into the mold/die cavity, is cast over the plurality of first exposed ends 42 to form a first shorting end ring 30 to electrically and mechanically connect the plurality of conductor bars 40. A second portion of the conductive material, which may also be in a molten state when introduced to the mold/die cavity, may be cast over the plurality of second exposed ends 46 to form a second shorting end ring 30' to electrically and mechanically connect the plurality of conductor bars 40.

In various configurations, the portion of molten material that ultimately solidifies to form the shorting end ring engulfs the respective conductive layer 41 (and the flux 32 if utilized) at the first and second exposed ends 42, 46 of the copper conductor bars 40 and flows through the apertures 48, 50. The cutaway portion 100 of the FIG. 3 shows the first exposed end 42 of one particular conductor bar 40 and the aperture 48 defined in the first exposed end 42. FIG. 3 shows the penetration of the portion of molten material through the aperture 48. When the portion of molten material solidifies, it forms the shorting end ring 30 with the conductor bar 40 locked into the solidified structure of the shorting end ring 30. The flow and solidification interlocks the shorting end ring 30, and conductor bars 40 into a singular assembly. When the second end 16 of the rotor assembly 10 undergoes a similar casting process creating a shorting end ring 30', the laminate stack 22 is also interlocked with the shorting end rings 30, 30' and the conductor bars 40. FIG. 3 shows shorting end ring 30' after it has been machined to a final state with a finished outside diameter 50 and end surface 51. FIG. 3 depicts shorting end ring 30 in an "as cast" state.

In a particular configuration, components of the rotor assembly 10 may be preheated, for example in an industrial oven or with induction heating apparatus, prior to casting. Preheating the components may promote casting integrity by substantially reducing quenching of the molten material as the molten material contacts the exposed ends 42, 46 and laminate stack 22. The molten material creates a metallurgical bond with the conductor bars 40 and cools to form the shorting end ring 30, 30' as a monolithic casting. The shorting end ring 30, 30' includes a portion that extends through each of the conductor bars 40 at the apertures 48, 49 to create a mechanical interlock 52 at the aperture 48, 49. During the casting process the previously applied flux layer 32 is largely displace from the interface between the conductor bar 40 and the shorting end rings 30, 30, but a small amount of residual may remain. The mechanical interlock 52 cross section can be adjusted for shear strength based on the size of the aperture 48, 49, that is, shear strength of the mechanical interlock 52 may be increased by increasing the amount of material in the aperture 48, 49.

The mechanical interlock 52 may also be sized for directional strength corresponding to the direction of high stress, that is, the aperture 48, 49 may be elongated in the direction with the highest stress under operating conditions. Additionally, the aperture 48, 49 may be optimized for electrical conductivity between the conductor bars 40 and the shorting end ring 30, 30', that is, the aperture 48, 49 may have a shape, for example, a star pattern, that increases surface area contact between the conductor bar 40 and the shorting end ring 30, 30'. Although the aperture 48, 49 is discussed as being present on each of the conductor bars 40, in certain configurations, a fraction of the plurality of conductor bars 40 may include the aperture 48, 49, for example, one-half and one-third of the conductor bars 40 may have the aperture 48, 49.

Further, in various configurations, an aperture 48 or 49 may be defined in at least one of the first exposed end 42 or the second exposed end 46. In an example, the first exposed end 42 may define aperture 48, and the second exposed end 46 may not define an aperture. In another configuration, the first exposed end 42 may not have an aperture defined therein, and the second exposed end 46 may define an aperture 49. In yet a further example, an aperture 48 may be defined in the first exposed end 42, and an aperture 49 may be defined in the second exposed end 46.

In various configurations, the rotor assembly 10 may be removed from the die and machined to remove over-cast material that may be present as a result of the casting process. The shorting end ring 30' may have the over-cast material removed and may expose the peripheral edge 45 of the conductor bars 40 depicted by shorting end ring 30' in FIG. 3. A net-zero die cast process, that is, a process that does not require machining after casting, may also be utilized. As a result, shorting end rings 30 and 30' include an axis of rotation 15 coincident to the rotor assembly 10, the rotor shaft, and rotor core 20 (FIG. 1).

Figure 4:
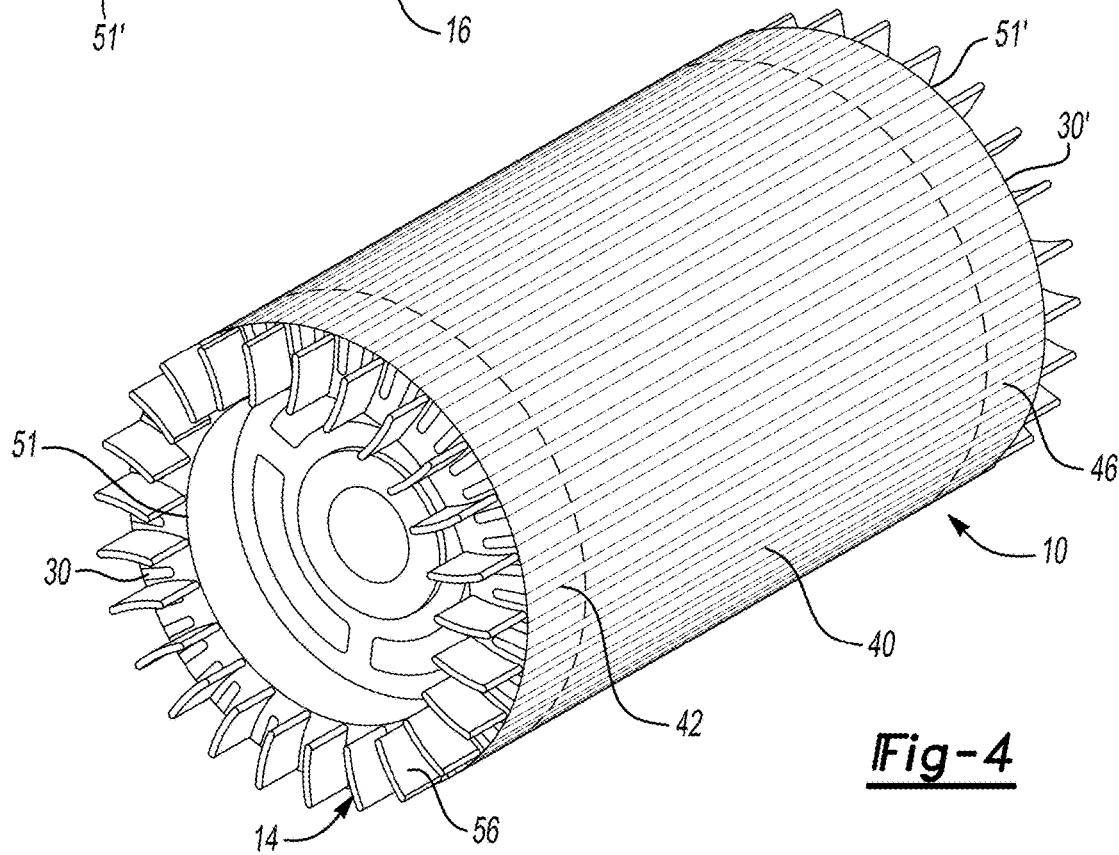
FIG. 4 illustrates a rotor assembly with finished castings of shorting end rings that includes a plurality of cast-in heat sinks in accordance with the principles of the present disclosure.

Heat may be generated in the induction motor during operation. Heat may be transferred away from the induction motor according to a number of methods. A liquid coolant may be used to cool the motor. In an example of the present disclosure, air may be used to cool the motor. FIG. 4 illustrates a rotor assembly 10 with finished castings of shorting end rings 30, 30' that include a plurality of cast-in heat sinks 56. The heat sinks 56 may be used in air-cooled motors and may be extensions of the end rings 30, 30' repeated evenly around the circumference of the end surface 51, 51' of the shorting end rings 30, 30'. The heat sinks 56 transfer heat generated by a spinning rotor assembly 10 from the shorting end rings 30, 30' to each of the plurality of heat sinks 56. The heat sinks 56 provide additional surface area to transfer absorbed heat to passing air as the rotor assembly 10 spins. As such, the heat sinks may be fins as well as impellers to cause movement of cooling air. The heat sinks 56 may be located on one or both of the shorting end rings 30, 30'. The heat sinks 56 may be directly cast in place when a net-zero die cast process is used. The heat sinks 56 may be machined when over-casting of material is used.

Unintended separation of the shorting end rings 30, 30' from the conductor bars 40 is substantially prevented by both the mechanical interlock 52 and the metallurgical bond between the shorting end rings 30, 30' and the conductor bars 40. The combination of the mechanical interlock 52 and the metallurgical bond create a total bond. The strength of the total bond is pre-determined to avoid separation of the shorting end rings 30, 30' from the conductor bars 40 as the inertial forces increase at high motor speeds.

The disclosed method to cast a shorting end ring 30, 30' onto a rotor 20 may be used on one or both ends of the rotor 20.

In various configurations, the flux material 32 for over-casting aluminum over copper may include $CsAlF_4$ (Cesium tetra-fluoroaluminate), CsAlF-complex, $K_{1-3}AlF_{4-6}$ (potassium fluoroaluminates) or other flux materials. The flux material 32 may be in form of powder or paste. The powder is often mixed in water or alcohol for easily applying the flux to the ends 42 and 46 of the conductor bar 40. The flux may be applied by dipping in a reservoir containing the flux material 32, by using a spray gun, brush or by any other method.

When the conducive bar 40 is coated with the conductive layer 41, with or without flux material 32, a continuous and crack-free metallurgical bond is formed between the conductor bar 40 and the cast aluminum shorting rings 30, 30'. If the conductor bar 40 is made of copper, the conductive layer 41 protects the copper from reacting and dissolving in molten aluminum to form deleterious intermetallics between the conductor bars 40 and the shorting rings 30, 30' during the casting process. Further, the conductive layer 41 does not change the effective electrical resistance of the conductor bar 40.

In particular configurations, the conductive layer 41 is made of Ni (nickel). Nickel has a much higher melting temperature (about 1455° C.) than copper to protect the copper from being dissolved by the molten aluminum. Nickel has much slower reaction kinetics in contact with molten aluminum than does copper. Hence, the nickel barrier prevents the otherwise rapid attach of the copper bar 40 by, for example, molten aluminum. Further, nickel has a similar thermal expansion coefficient to copper, which reduces the risk of film delamination during the casting process or from thermal cycles under heavy loads. In other configurations, the conductive layer 41 be made of Co (cobalt), Fe (iron), Mn (manganese), Cr (chromium), V (vanadium) or Ti (titanium).

Figure 5:
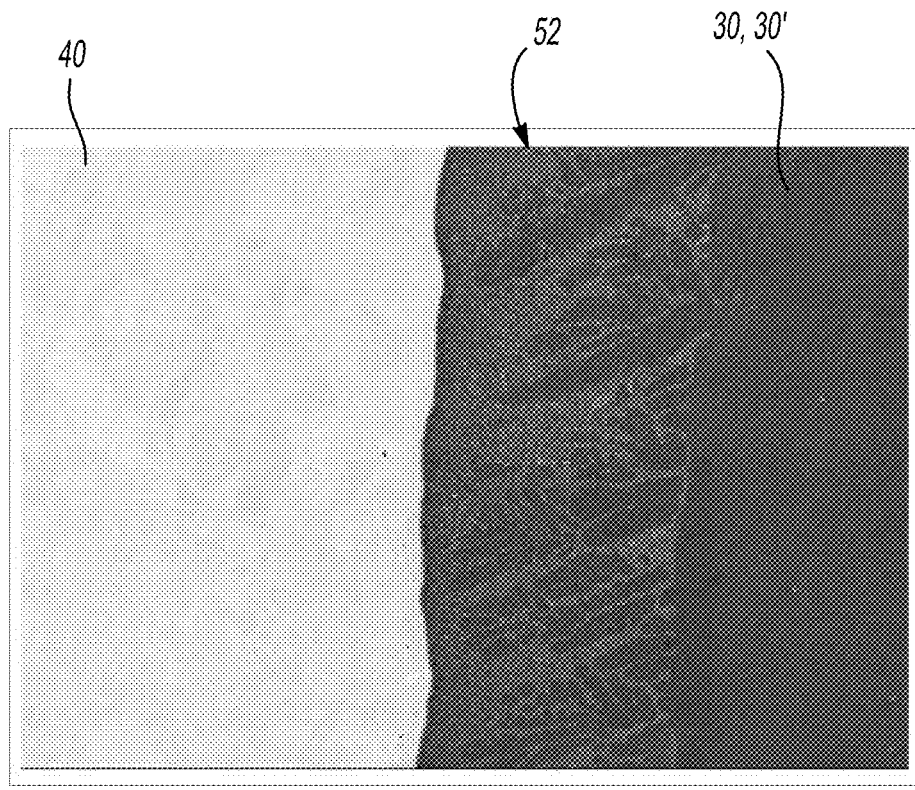
FIG. 5 illustrates a cross-sectional view of a conductor bar and a shorting end ring in accordance with the principles of the present disclosure.

As shown in FIG. 5, in a particular configuration, an $Al_3Ni/Al$ eutectic layer 52 is formed between the copper conductor bar 40 and the aluminum shorting rings 30, 30' when the conductive layer 41 is made of nickel. In the example shown in FIG. 5, the eutectic layer 52 is about 160 micrometers thick.

Figure 6:
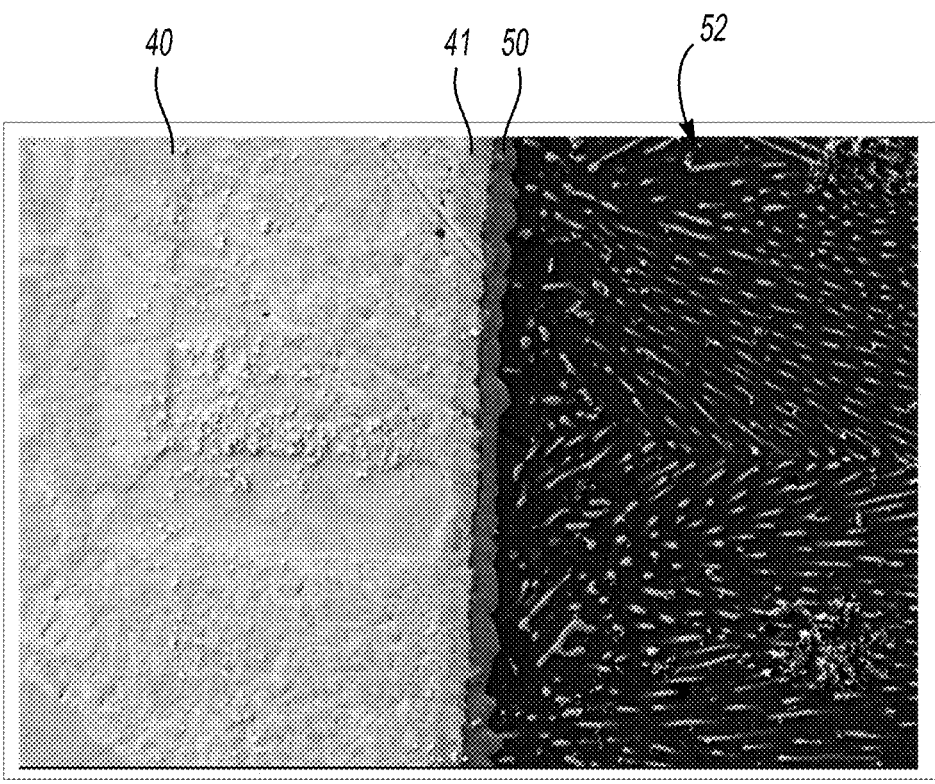
FIG. 6 illustrates a close-up view of the region between the conductor bar and the shorting end shown in FIG. 5 in accordance with the principles of the present disclosure.

FIG. 6 shows a close-up view of the interface between the copper conductor bar 40 and the eutectic layer 52. Specifically, an intermetallic layer 50 is formed between the nickel conductive layer 41 and the eutectic layer 52. In this particular example, the nickel conductive layer 41 has a thickness from about 5 micrometers to about 15 micrometers, with a nominal thickness of about 10 micrometers. The intermetallic layer 50 has a similar thickness.

The conductive layer 41 can be applied to the conductor bar 40 by physical vapor deposition, chemical vapor deposition or plating. When plated to the conductor bar 40, the plating process can be electrolytically plating or electrolessly plating.

It is to be understood use of the words "a" and "an" and other singular referents may include plural as well, both in the specification and claims, unless the context clearly indicates otherwise.

Further, it is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Yet further, it is to be understood that the ranges provided herein include the stated range and any value or sub-range within the stated range. For example, a range from about 0.25 mm to about 0.51 mm should be interpreted to include not only the explicitly recited limits of about 0.25 mm to about 0.51 mm, but also to include individual values, such as 0.25 mm, 0.30 mm, 0.33 mm, etc., and sub-ranges, such as from about 0.28 mm to about 0.45 mm, from about 0.30 mm to about 0.40 mm, etc.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor for an induction motor, comprising:
   a first shorting end ring;
   a second shorting end ring; and
   a plurality of conductor bars, each conductor bar having a first end and a second end and each conductor bar consisting essentially of a single material and an electrically conductive layer on the first end and on the second end with no intervening material between the first end and the electrically conductive layer and between the second end and the electrically conductive layer, the plurality of conductor bars being configured such that no intervening material is between the electrically conductive layer on the first end and the first shorting ring and no intervening material is between the electrically conductive layer on the second end and the second shorting ring so that the first end of each conductor bar is in electrical and mechanical contact with the first shorting end ring and the second end of each conductor bar is in electrical and mechanical contact with the second shorting end ring.

2. The rotor of claim 1, further comprising a small amount of residual flux material disposed between the conductive material and the respective first and second shorting end rings.

3. The rotor of claim 1, wherein each conductor bar is coated with the electrically conductive layer along the entire length of the conductor bar or just at the ends of the conductor bar that contact the first and the second shorting end rings.

4. The rotor of claim 1, wherein the first and second shorting end rings are made of cast aluminum.

5. The rotor of claim 4, wherein the conductor bars are made of wrought copper.

6. The rotor of claim 5, wherein the conductive layer is made of nickel.

7. The rotor of claim 5, wherein the conductive layer is made of cobalt, iron, manganese, chromium, vanadium or titanium.

8. The rotor of claim 1, wherein the conductive layer is applied to the conductor bar by physical vapor deposition, chemical vapor deposition or plating.

9. The rotor of claim 1, wherein the conductive layer is applied by electrolytically plating.

10. The rotor of claim 1, wherein the conductive layer is applied by electrolessly plating.

11. The rotor of claim 1, wherein the conductive layer has a thickness of about 5 micrometers to about 15 micrometers.

12. The rotor of claim 1, wherein the conductive layer has a thickness of about 10 micrometers.

13. A rotor for an induction motor, comprising:
a first shorting end ring made of cast aluminum;
a second shorting end ring made of cast aluminum; and
a plurality of conductor bars, each conductor bar being made of wrought copper and having a first end and a second end, each conductor bar consisting essentially of a single material and an electrically conductive layer on the first end and on the second end with no intervening material between the first end and the electrically conductive layer and between the second end and the electrically conductive layer, the plurality of conductor bars being configured such that no intervening material is between the electrically conductive layer on the first end and the first shorting end ring and no intervening material is between the electrically conductive layer on the second end and the second shorting end ring so that the first end of each conductor bar is in electrical and mechanical contact with the first shorting end ring and the second end of each conductor bar is in electrical and mechanical contact with the second shorting end ring.

14. The rotor of claim 13, further comprising a small amount of residual flux material disposed between the conductive material and the respective first and second shorting end rings.

15. The rotor of claim 13, wherein each conductor bar is coated with the electrically conductive layer along the entire length of the conductor bar or just at the ends of the conductor bar that contact the first and the second shorting end rings.

16. The rotor of claim 13, wherein the conductive layer is made of nickel.

17. The rotor of claim 13, wherein the conductive layer is made of cobalt, iron, manganese, chromium, vanadium or titanium.

18. The rotor of claim 13, wherein the conductive layer is applied to the conductor bar by physical vapor deposition, chemical vapor deposition or plating.

19. A method of fabricating a rotor for an induction motor, comprising:
coating a plurality of conductor bars with an electrically conductive material, each conductor bar being made of wrought copper and having a first end and a second end, each conductor bar consisting essentially of a single material and an electrically conductive layer on the first end and on the second end with no intervening material between the first end and the electrically conductive layer and between the second end and the electrically conductive layer;
electrically connecting the first ends of the plurality of conductor bars to a first shorting end ring made of cast aluminum, and
electrically connecting the second ends of the plurality of conductor bars to a second shorting end made of cast aluminum,
wherein the plurality of conductor bars are configured such that no intervening material is between the electrically conductive layer on the first end and the first shorting end ring and no intervening material is between the electrically conductive layer on the second end and the second shorting end ring so that the first end of each conductor bar is in electrical and mechanical contact with the first shorting end ring and the second end of each conductor bar is in electrical and mechanical contact with the second shorting end ring.

20. The method of claim 19, wherein the conductive material is made of nickel, cobalt, iron, manganese, chromium, vanadium or titanium.

* * * * *